United States Patent [19]

Ryham

[11] Patent Number: 4,963,231
[45] Date of Patent: Oct. 16, 1990

[54] METHOD FOR EVAPORATION OF LIQUIDS

[75] Inventor: Rolf Ryham, Princeton, N.J.

[73] Assignee: Ahlströmföretagen Svenska AB, Lindövägen, Sweden

[21] Appl. No.: 206,118

[22] Filed: Jun. 13, 1988

[51] Int. Cl.$^5$ .............................................. B01D 3/00
[52] U.S. Cl. ...................... 203/22; 159/16.1; 159/23; 159/47.1; 159/DIG. 32; 162/29; 162/47; 202/176; 202/180; 202/195; 202/235; 203/27; 203/47; 203/49; 203/98; 203/DIG. 8; 203/DIG. 9
[58] Field of Search ............ 203/49, 22, 98, 27, 203/47, DIG. 8, 89, 90, DIG. 9; 159/23, 47.1, 48.1, 49, DIG. 32, 901, 16.1; 202/201, 180, 176, 236, 195, 237, 235

[56] References Cited

U.S. PATENT DOCUMENTS

| | | | |
|---|---|---|---|
| 3,092,535 | 6/1963 | Tomlinson II | 159/47.3 |
| 3,261,766 | 7/1966 | Sherwood | 203/42 |
| 3,455,363 | 7/1969 | Vegeby | 159/16.1 |
| 3,928,983 | 12/1975 | Ainbinder et al. | 159/2.3 |
| 4,137,134 | 1/1979 | Suominen et al. | 162/16 |
| 4,152,217 | 5/1979 | Eisenberg et al. | 203/42 |
| 4,164,125 | 8/1979 | Griffiths | 62/79 |
| 4,171,620 | 10/1979 | Turner | 62/79 |
| 4,209,364 | 6/1980 | Rothschild | 203/25 |
| 4,222,244 | 9/1980 | Meckler | 62/271 |
| 4,310,382 | 1/1982 | Gress | 159/24.2 |
| 4,402,795 | 9/1983 | Erickson | 202/184 |
| 4,651,819 | 3/1987 | Yumikura et al. | 165/115 |
| 4,687,546 | 8/1987 | Willis | 159/DIG. 32 |

Primary Examiner—Virginia Manoharan
Attorney, Agent, or Firm—Cohen, Pontani & Lieberman

[57] ABSTRACT

Process for the evaporative concentration of liquids. Vaporization is carried out by indirect heat exchange with a heating fluid in an evaporator. The vapor produced in the evaporator is thereafter condensed in a condenser by indirect heat exchange with a cooling liquid which is mainly composed of the liquid to be concentrated or the liquid which has already been concentrated in the evaporator. The vapor pressure over the cooling liquid in the condenser may be lowered by causing gas to flow in contact with the cooling liquid.

9 Claims, 2 Drawing Sheets

METHOD FOR EVAPORATION OF LIQUIDS

TECHNICAL FIELD

The present invention relates to a method and apparatus for evaporative concentration of liquids and particularly to a method and apparatus utilizing the heat energy of the vapor leaving the evaporator to evaporate the liquid.

BACKGROUND AND SUMMARY OF THE INVENTION

One aspect of the present invention is directed to the treatment of an absorption liquid, such as a concentrated salt solution and the like which may be used in the dehumidification of gas such as air. During such dehumidification process the concentrated salt solution is being diluted by absorbing moisture from the air. The diluted salt solution is reconcentrated prior to being reintroduced into the absorption process.

Another aspect of the present invention is directed to concentrating spent liquor from pulping processes in evaporating plants in which the waste liquor is concentrated to a degree of dryness which permits the combustion thereof to recover the pulping chemicals. In conventional evaporating plants the liquor is generally concentrated by evaporation in one or more separate evaporation stages. The vapor from the last stage is usually condensed by bringing the vapor into indirect contact with cooling water in a condenser as, for example, the one disclosed in U.K. Patent Application No. GB 2 000 584.

The present invention is directed to a method and apparatus for concentrating a liquid by evaporation resulting in high thermal efficiency by utilizing the heat energy of vapor and preferably by utilizing the heat energy of the vapor leaving the evaporator instead of removing heat energy from the evaporating system to an external cooling water system. It will, however, be understood that the heat required for the evaporation of liquid may be derived from sources other than the vapor exiting from the evaporator. The present invention can thus be applied to the evaporative concentration of liquids in general and the specific examples given herein should thus not be construed to limit the scope of the present invention in any manner.

According to one embodiment of the invention, air is dehumidified by direct contact with a water-absorbing liquid. An aqueous solution of an easily soluble salt such as potassium acetate, sodium acetate, potassium carbonate, calcium chloride, lithium chloride and lithium bromide or the like or mixtures thereof is used as the absorption liquid. These concentrated salt solutions exhibit great affinity to water. Consequently, the water vapor pressure above the solution is correspondingly low.

If air at a certain temperature and of a certain relative humidity is brought into contact with such a concentrated salt solution, water vapor from the air is absorbed by the solution as long as the water vapor pressure above the salt solution is lower than that reached during the state of equilibrium.

When air is dehumidified by absorption of water vapor, the absorption liquid will become increasingly diluted by the absorbed water. As the only volatile component of the absorption liquid is water, the absorption liquid can be regenerated by evaporation. This is usually accomplished by heating the absorption liquid to a temperature at which the water vapor pressure thereof exceeds the atmospheric pressure thus causing the water to evaporate. The boiling point elevation of the concentrated salt-water solution suitable for absorption purposes is high. Generally, the dilution of the absorption liquid by absorption of water vapor is relatively small and, consequently, evaporation in more than one stage is usually not feasible so that the diluted absorption liquid is usually regenerated by evaporation in a single stage evaporator.

To regenerate the absorption liquid in an evaporator an amount of energy corresponding to the heat of vaporization is required. Additional energy is needed to heat up the liquid to the boiling temperature thereof and to compensate for heat losses and the like.

According to a preferred embodiment of the present invention, the heat energy of the vapor leaving the evaporator is used to evaporate water from the absorption liquid. This is accomplished by bringing the vapor into indirect contact with the absorption liquid either before or after the absorption liquid is concentrated in the evaporator or both. The vapor exiting from the evaporator is brought into contact with one surface of a heat exchange element while the absorption liquid is brought into contact with the other surface of the heat exchange element. The absorption liquid is preferably caused to flow down in form of a thin film on the surface of the heat exchange element. In addition, air is caused to flow in contact with the absorption liquid to lower the water vapor pressure above the absorption liquid thus enhancing the evaporation of water from the absorption liquid. The air will be saturated by water vapor and the vaporization heat is removed from the surface of the heat exchange element.

By condensing the vapor from the evaporator by means of the absorption liquid which thus will be concentrated before the evaporator and/or after the evaporator, a higher coefficient of performance as well as significant energy savings are obtained. An additional advantage of the invention is that the need of an external cooling water system is eliminated. The method and apparatus of the present invention thus provide a process similar to an evaporation in two stages or two effects with its considerably lower specific energy consumption. Although only one evaporator is shown in the accompanying drawings, it will be understood that more than one evaporator can be used. The preferred process of the present invention, i.e. when the vapor from the last evaporator stage is utilized for concentrating the solids containing liquid such a the absorption liquid or the spent liquor, results in an evaporation of $n+1$ effects, whereby n can be one or an integer greater than one, and is preferably below about ten. For example in a system with three evaporators in series (i.e. n equals three) the process of the present invention effectively results in evaporation corresponding to four stages or effects.

This and other objects of the present invention will become clear from an inspection of the drawing, the detailed description of the invention and from the appended claims.

DESCRIPTION OF THE PRESENTLY PREFERRED EMBODIMENTS

Figure 1:
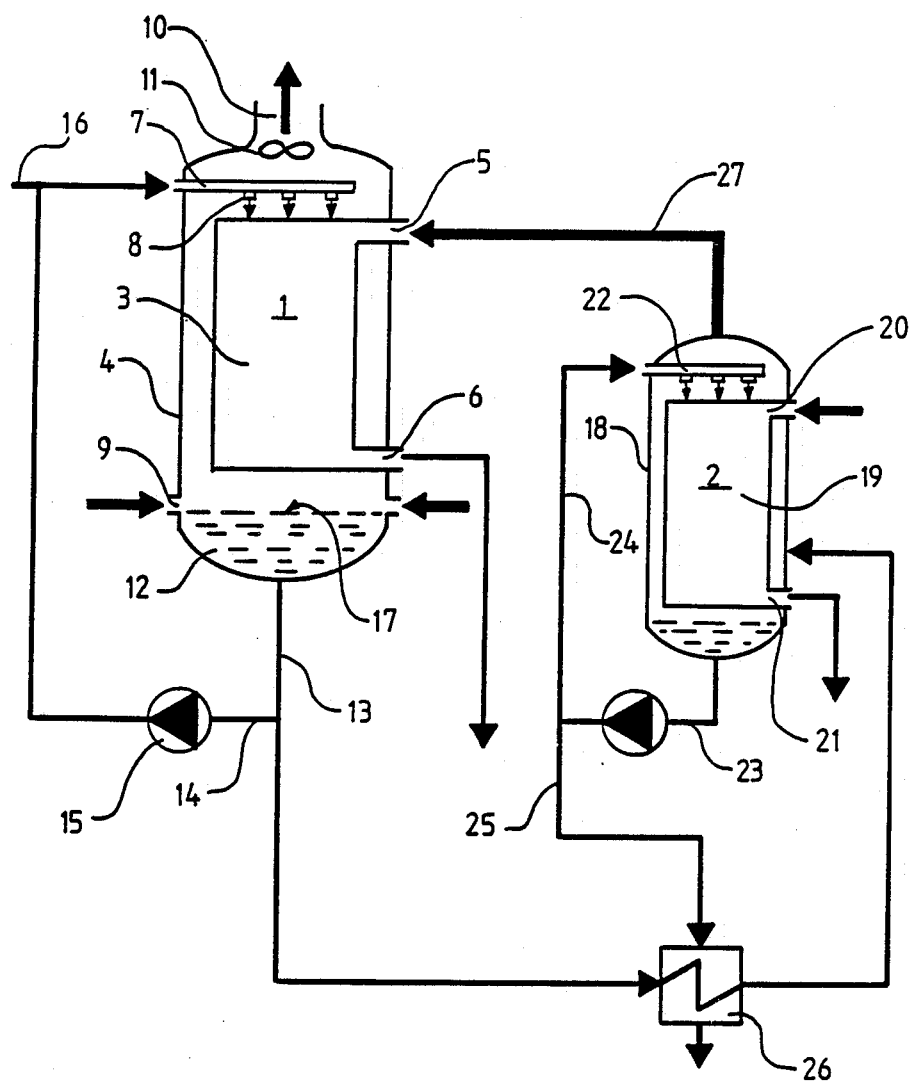
FIG. 1 is a schematic flow diagram illustrating an evaporation system in which spent liquor from a pulping process is being concentrated.

As shown in FIG. 1, the evaporation system comprises an evaporative condenser 1 and an evaporator 2. The evaporative condenser preferably includes one or more preferably vertically disposed spaced apart conventional heat exchange elements 3 which are preferably composed of pairs of substantially parallel plates which are connected at their edges to form a plurality of closed spaces within housing or casing 4. Other suitable configurations of heat exchange elements such as a radially extending arrangement of elements or tube-type heat exchangers may also be used. Open channels are formed between the heat exchange elements 3. The interiors of the heat exchange elements are connected at their upper end to an inlet 5 for the admission of water vapor and at their lower end to an outlet 6 for the removal of condensate. Although the water vapor used for the evaporative concentration of liquids is preferably taken from evaporator 2, vapor or steam from suitable sources outside the system may also be used. As pointed out above, however, the use of the vapor from evaporator 2, or if more than one evaporator, the use of the vapor exiting from the last evaporator, will advantageously result in n+1 evaporation effects. The letter n is either one or an integer greater than one but is preferably below about ten. A distributor means 7 provided with a plurality of openings or spray nozzles 8 extends lengthwise across the casing above each heat exchange element so as to form means for distributing absorption liquid preferably substantially uniformly over the outer surfaces of the heat exchange elements. The housing or casing is provided with one or more air inlets 9 preferably located at a level below or about the vicinity of the lower ends of the heat exchange elements 3 and an outlet 10 for air located in the upper end of the casing. An impeller 11 or fan is disposed preferably adjacent the outlet 10 to effect an upward flow of air through the casing.

The bottom of the housing forms a reservoir 12 below the air inlets 9 collecting the absorption liquid dropping from the lower ends of the heat exchange elements. The liquid is subsequently withdrawn from the reservoir through a discharge conduit 13 at the bottom of the reservoir. A branch conduit 14 connected to discharge conduit 13 and a pump 15 are provided for recirculating at least a portion of the liquid. Feed liquid, e.g. spent liquor from the pulping process, is introduced into distributor means 7 through conduit 16. Conduit 16 is connected to conduit 14 for permitting the admixture of recirculating liquid flowing through conduit 14 into conduit 16 due to the action of pump 15.

The level 17 of the liquid in reservoir 12 is preferably controlled and maintained substantially constant in a manner known per se.

The evaporator 2 includes disposed within housing or casing 18 preferably a plurality of spaced apart heat exchange elements 19 having interior and exterior surfaces and which may be of similar design as the heat exchange elements 3 of the condenser 1 also having an inlet 20 and outlet 21 for a heating fluid such as flue gases or steam.

A distributor 22 forms means for distributing liquid preferably uniformly over the outer surfaces of the heat exchange elements. Concentrated liquid collected at the bottom of the housing is withdrawn from the evaporator through a discharge conduit 23. At least a portion of the concentrated liquid may be recirculated to distributor or distribution conduit 22 through conduit 24 while the remainder may be removed through conduit 25 and transferred to heat exchanger 26. The vapor produced in the housing 18 by evaporation of absorption liquid is transferred to the interior of the heat exchange elements 3 of the condenser 1 through conduit 27.

The liquid to be concentrated by evaporation, such as for instance black liquor from a pulping process, is fed to the condenser 1 through conduit 16 and introduced into the distributor 7. From there the black liquor is flowing down preferably uniformly over the outer surfaces of the heat exchange elements 3 and will thereby be heated by indirect contact with the hot water vapor introduced into heat exchange elements 3 from the evaporator 2 or other suitable outside sources. Gas, preferably preheated, which is supplied through inlet 9 and flowing through the housing along the outside of the heat exchange elements will, by direct contact with the black liquor, lower the boiling point of the black liquor and cause evaporation of water therefrom. The water vapor together with the air is removed from the condenser through the outlet 10. The heat energy required for the evaporation of water from the black liquor is removed from the water vapor inside the heat exchange elements causing the vapor to condense. The preconcentrated black liquor is discharged from the reservoir 12 through conduit 13 and transferred to the evaporator 2 via heat exchanger 26 to raise the temperature thereof prior to entry into the evaporator by indirect heat contact with concentrated liquor exiting from evaporator 2.

In the evaporator the preconcentrated black liquor is heated to its boiling point on the outer surfaces of heat exchange elements 19 by means of, for example, hot flue gases or steam introduced into the heat exchange elements through inlet 20 and removed together with the respective condensate through outlet 21. The black liquor will be concentrated by evaporation and the water vapor formed thereby is preferably led to condenser 1 through conduit 27 to be condensed and to serve as a heating medium for preconcentrating the black liquor.

EXAMPLE 1

Black liquor from a pulping process containing about 20-25% solids by weight resulting in a boiling point elevation of about 4°-5° C. enters evaporative condenser 1 through conduit 16 and is substantially evenly distributed as a thin-film over the outside of heat exchange elements 3 by means of distributor 7. While flowing over the heated exchange surfaces water is evaporated from the liquor due to the heat transfer from the vapor condensing on the inside of the heat exchanger. Moreover, the water vapor pressure of the liquor is reduced by an air flow contacting the black liquor film.

The incoming liquor has a temperature of about 55° C. and a discharge temperature of about 55° C., while the air temperature has increased from about 20° C. to about 30° C. 30,000 kg/h of vapor from evaporator 2 have been introduced into condenser 1 via conduit 27. About 23,000 kg/h of water has been evaporated from the black liquor by contact with air in condenser 1. Thus, compared to a conventional six stage (effect) evaporator the capacity of the process of the present invention has been increased by about 12–15% without additional thermal energy.

Figure 2:
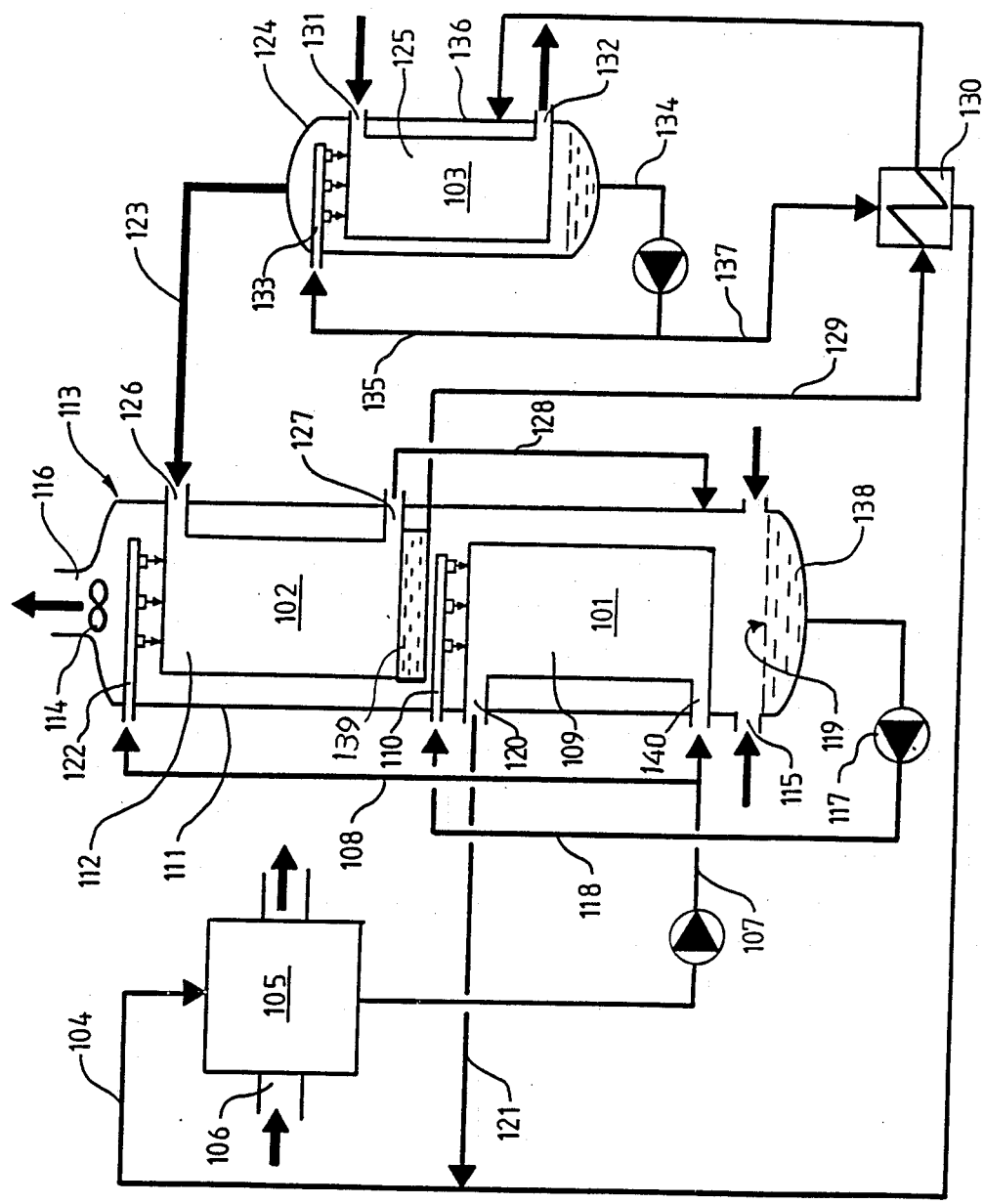
FIG. 2 is a schematic flow diagram illustrating an evaporation system in which water-absorbing salt solution used for the dehumidification of air is being concentrated.

Turning now to FIG. 2, the regenerating system for an absorption liquid comprises a cooler 101, an evaporative condenser 102 and an evaporator 103. Concentrated absorption liquid is fed through conduit 104 to absorber 105 where it is brought into direct contact with moist air flowing through conduit 106 so as to remove moisture therefrom. At least a portion of the absorption liquid which has absorbed moisture from the contacting air is directed through conduit 107 to cooler 101 while another portion is directed through branch-conduit 108 to condenser 102.

The diluted absorption liquid exiting the absorber and to be concentrated by evaporation is thus first fed to condenser 102 through branchconduit 108 where it is introduced into distributor 122 disposed above one or more heat exchange elements 112 of the condenser so as to cause the absorption liquid to flow down in form of a thin film preferably uniformly over the outer surface of the heat exchange element. Distributors 7, and 22 of FIG. 1 and 110, 122 and 133 of FIG. 2 may be of any suitable construction such as a perforated pipe or a container having a perforated bottom plate and form means for preferably evenly distributing the respective liquid over the outer surfaces of the heat exchangers. The heat exchange elements of FIG. 2 may be of similar design as that described above in connection with condenser 1 of FIG. 1. Water vapor preferably supplied through conduit 123 connected to the top of the housing or casing 124 enclosing one or more the heat exchange elements 125 of evaporator 103 is introduced into inlet 126 to one or more of the heat exchange elements 112. As mentioned above, water vapor or any other suitable heating fluid from sources other than evaporator 103 may be utilized as heating medium in condenser 102. It is also important to note that the cooling liquid utilized in condensers 1 and 102 is not limited to the absorption liquid (concentrated salt solution), or the spent liquor from the pulping process as exemplified but that any solids containing liquid or solution is suitable as a cooling liquid in the process of the present invention provided the liquid or solution can be concentrated to increase the solids content thereof. In this context solids containing liquids includes liquids containing dissolved solids.

Thus, while pure water could also be a suitable cooling liquid, solids containing liquids such as a salt solution, black liquor or white liquor are preferred, since these liquids, if utilized as cooling liquids are concentrated by evaporation so that the solids content of the liquid is increased thereby. The water vapor contacting the inner surfaces of the heat exchange elements 112 condenses by indirect contact with the absorption liquid flowing over the outer surfaces of the heat exchange elements and may then be removed through outlet 127 as condensate which is fed to liquid pool 119 located in the bottom of the housing 124 through conduit 128.

Absorption liquid preconcentrated by evaporation of water therefrom in condenser 102 is dropping down into vat 139 preferably disposed below the lower ends of the heat exchange elements 112. The preconcentrated absorption liquid is then transferred to evaporator 103 through conduit 129 preferably via heat exchanger 130 to raise the temperature thereof prior to entry of the liquid into the evaporator by indirect contact with the concentrated absorption liquid previously withdrawn from the evaporator.

The evaporator comprises preferably a plurality of heat exchange elements 125 which may be of similar construction as those of condenser 102 having an inlet 131 and an outlet 132 for a heating fluid such as flue gases or steam. A distributor 133 preferably disposed above the upper ends of the heat exchange elements supplies absorption liquid to the outside surfaces of the heat exchange elements 125 in the same manner as distributors 7, 110 or 122. The absorption liquid will be heated to its boiling point whereupon water will evaporate from the liquid which is flowing down over the outer surfaces of the heat exchange elements. The concentrated absorption liquid collected at the bottom of the casing 136 is withdrawn from the evaporator through discharge conduit 134. At least a portion of the concentrated liquid may be recirculated to the distribution conduit or distributor means 133 through conduit 135. The remainder of the concentrated liquid is transferred through conduit 137 via the heat exchanger 130 to the cooler 101. Alternatively, and depending on the degree of required cooling of the moist air or gas flowing through conduit 106 all of the concentrated absorption liquid or a portion thereof may be directly fed from heat exchanger 103 to absorber 105 (not shown).

The water vapor generated in housing 136 of the evaporator by evaporation of the absorption liquid on the outer surfaces of the heat exchange elements 125 is withdrawn from the evaporator and transferred through conduit 123 to the evaporative condenser 102 to be condensed therein and to serve as a heating medium for preconcentrating the absorption liquid in the manner described above.

The portion of the concentrated absorption liquid fed to the cooler 101 is introduced into inlet 121 of the heat exchange elements 109 which may be of similar design as those of the condenser 1 of FIG. 1. The concentrated absorption liquid is brought into indirect heat exchanging contact with a cooling liquid supplied by distributor means 110 disposed above the heat exchange elements 109 and flowing down preferably in form of a uniform thin film over the outer surfaces of the heat exchange elements. The cooling liquid preferably comprising the condensate from the condenser 102 is collected at the bottom of casing 111 enclosing the heat exchange elements 109 of cooler 101 and the heat exchange elements 112 of condenser 102 which are disposed preferably above elements 109. Additional cooling water may be added at valve 140 or to liquid pool 138. In contrast to known cooling devices at least a significant part of the cooling water used for evaporative cooling at condenser 102 and cooler 101 thus originates from the moist air stream flowing through conduit 106. Heat exchange elements 109, 112 and casing 111 form cooling tower 113 through which air is drawn by means of impeller 114. The cooling liquid 119 collected in a pool 138 at the bottom of the casing is preferably recirculated by a pump 117 through conduit 118 to distributor 110. The level of the liquid 119 is preferably controlled and maintained substantially at a constant level.

The air, sometimes also called scavenger air, flowing through casing 111 over the outside surfaces of heat exchange elements 109 of cooler 101 is in direct contact with the outside surfaces wetted by the cooling liquid and will cause evaporation of water from the cooling liquid. The evaporated water is removed by the air flow. Evaporation of water causes the removal of heat from the absorption liquid. The cooled absorption liquid is withdrawn from the heat exchange elements 109 through outlet 120 and returned to the absorber 105 through conduit 104. The amount of scavenger air required for cooling the absorption liquid and flowing over heat exchange surfaces 109 of cooler 101 without evaporative cooling is about ten times greater than with evaporative cooling as described above.

The amount of scavenger air flowing through casing 111 through inlet 115 is thus carefully balanced. Generally, 90% of the air introduced into inlet 115 may be withdrawn prior to the air coming into contact with condenser 102 The withdrawn air stream is not indicated in FIG. 2.

EXAMPLE 2

Air is introduced into absorber 105 at a rate of 8,100 kg/h dry air and under the following conditions: $t=30°$ C. dry bulb, 27° C. wet bulb; $x=0.021$ kg $H_2O$/kg dry air.

After absorption, air is exiting from absorber 105 at a rate of 8,100 kg/h dry air under the following conditions: $t=37°$ C. dry bulb, 20° C. wet bulb; $x=0.0065$ kg $H_2O$/kg dry air. The amount of absorbed water is calculated as $8,100 (0.021-0.0065)=117$ kg. The amount of heat transferred to cooler 101 is approximately 200,000 kJ/h in 38,000 kg/h absorption liquid. is approximately 200,000 kJ/h in 38,000 kg/h absorption liquid.

During the absorption step the liquid stream in conduit 10B has taken up approximately 117 kg/h of water from the air. If the absorption liquid is evaporated in a single step evaporator after increasing the temperature of the absorption liquid to the temperature of the evaporator by heat exchange the energy consumption would be approximately 1 kg of steam per kg of evaporated water Using the evaporative condenser in accordance with the present invention as pre- and/or post-evaporator for the absorption liquid reduces the amount of energy required for the evaporation by about 1.5–1.9 times as compared to the use of only the evaporator.

Instead o the described heat exchange elements other tube-type heat transfer elements may also be used. Equally, if the concentration of the diluted salt solution is low and, the boiling point elevation thereof is therefor moderate thus enabling the evaporation in two conventional evaporation stages, the invention can also be used to condense the water vapor from a second or subsequent stage. In addition the heating medium in condenser 102 such as water vapor or steam may be generated and obtained from a source other than evaporator 103. Of course, the water vapor from evaporator 103 may be mixed with one or more heating fluids coming from other suitable sources. Preferably, however, the water vapor utilized in condensers 1 and 102 originates from evaporator 2 and 103, respectively.

Thus, it should be understood that the preferred embodiments and examples described above are for illustrative purposes only and are not to be construed as limiting the scope of the invention which is properly delineated in the appended claims. While the invention has been herein shown and described on what is presently conceived to be the most practical and preferred embodiment thereof it will be apparent to those of ordinary skill in the art that many modifications may be made thereof within the scope of the invention.

What is claimed is:

1. A process for the evaporative concentration of a liquid or solids containing liquid comprising the steps of:

heating the liquid to be concentrated to its boiling point by indirect heat exchange with a heating fluid in an evaporator to produce vapor;

condensing the vapor in an evaporative condenser having a heat exchange surface at the inside of said heat exchange surface by indirect heat exchange with a cooling liquid flowing over the outside of the heat exchange surface of the condenser thereby evaporating said cooling liquid;

utilizing as a cooling liquid in said condenser the liquid or the solids containing liquid which is concentrated by evaporation in said evaporator; and causing gas to flow over said heat exchange surface of said condenser in contact with said cooling liquid to lower the vapor pressure above said liquid.

2. The process in accordance with claim 1, wherein said vapor leaving said evaporator is directly brought into indirect contact with said liquid for condensing said vapor thereby.

3. The process in accordance with claim 1, wherein said cooling liquid is heated prior to the entry thereof into said evaporator by bringing said liquid into indirect contact with said concentrated liquid discharged from said evaporator.

4. The process in accordance with claim 1, wherein said cooling liquid is an absorption liquid.

5. The process in accordance with claim 4, wherein said absorption liquid is selected from the group consisting of an aqueous solution of potassium acetate, sodium acetate, potassium carbonate, calcium chloride, lithium chloride, lithium bromide and mixtures thereof.

6. The process in accordance with claim 1, wherein said cooling liquid is concentrated by evaporation after it has been utilized in said condenser.

7. The process in accordance with claim 1, wherein said cooling liquid is concentrated by evaporation prior to its utilization in said condenser.

8. The process in accordance with claim 1, wherein said cooling liquid is spent liquor from a pulping process.

9. The process in accordance with claim 1, wherein said gas is air.

* * * * *